United States Patent
Johnson et al.

(10) Patent No.: US 7,542,428 B1
(45) Date of Patent: Jun. 2, 2009

(54) GEOGRAPHICAL NETWORK ALARM VIEWER

(75) Inventors: David W. Johnson, Roswell, GA (US); Chris D. Boesl, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 672 days.

(21) Appl. No.: 11/046,213

(22) Filed: Jan. 28, 2005

Related U.S. Application Data

(60) Provisional application No. 60/539,818, filed on Jan. 28, 2004.

(51) Int. Cl.
*H04L 12/26* (2006.01)
(52) U.S. Cl. .................. 370/241; 370/242; 370/250; 379/9; 379/32.01
(58) Field of Classification Search .................. 370/243, 370/245, 241, 242, 250; 379/9.03, 9.04, 379/15.05, 32.01, 9, 15.01
See application file for complete search history.

(56) References Cited

U.S. PATENT DOCUMENTS

| | | | |
|---|---|---|---|
| 7,289,449 B1* | 10/2007 | Rubinstein et al. | 370/245 |
| 7,318,094 B1* | 1/2008 | Kirti et al. | 709/223 |
| 2004/0031059 A1* | 2/2004 | Bialk et al. | 725/129 |

* cited by examiner

*Primary Examiner*—Wing F Chan
*Assistant Examiner*—Matthew Campbell
(74) *Attorney, Agent, or Firm*—Merchant & Gould

(57) ABSTRACT

Methods and systems provide a geographical network alarm viewer (GNAV) application that receives, tracks, aggregates, reports, and maps data associated with cable telephony services outages occurring in a cable services network. The GNAV application integrates network map data and identification information associated with customer locations, equipment, and associated network alarm data from a network operations center. All customer location addresses associated with individual network alarms are located and mapped on a geographical network map. Because the alarms are received, tracked, aggregated, reported, and mapped in real-time, service personnel may respond to network outages in a more efficient manner, and service technicians and service vehicles may be directed to repair service outages based on more accurate location and service outage timing data.

15 Claims, 5 Drawing Sheets

GEOGRAPHICAL NETWORK ALARM VIEWER

CROSS REFERENCE TO RELATED APPLICATIONS

The present application claims priority from U.S. Provisional Patent Application No. 60/539,818, entitled "Geographical Network Alarm Viewer," filed Jan. 28, 2004, which is incorporated herein by reference as if fully set out herein.

FIELD OF INVENTION

The present invention generally relates to monitoring and reporting communications outages in a cable services system. More particularly, the present invention relates a geographical network alarm viewer.

BACKGROUND OF INVENTION

With the advent of cable television networks, cable customers have grown accustomed to receiving a variety of television programming from numerous broadcasting sources. In recent years, technology advances have enabled customers to receive an even greater variety of services through cable services networks. Modern cable services networks provide traditional video television programming, telephone services, high speed Internet access, electronic mail services, video-on-demand, information services, and the like.

Unfortunately, from time-to-time, consumers of cable services experience a loss of communications with their cable services provider. Losses of communications may be caused by a variety of problems. For example, a satellite downlink may be lost temporarily which causes a loss of communications across a vast service area. On the other hand, a coaxial cable may be damaged at a single home or other consumer location resulting in a loss of communications to a single consumer.

In order to provide quality cable services and to maintain customer satisfaction, cable services providers must strive to restore lost communications as quickly and as efficiently as possible. Unfortunately, prior methods and systems typically only provide a cable services provider with a rough understanding of the area of lost communications and very little insight as to the nature of a given services outage. For example, a cable services provider may be notified that a given node servicing 1,000 homes is experiencing services outages without any real-time information as to the particular locations or nature of the outages. According to some prior systems, the cable services provider must rely on calls from individual customers to learn of particular services outages. Under such circumstances, cable services providers often roll multiple technicians and service vehicles to respond to a given services outage when only a single technician and service vehicle is actually needed.

Accordingly, there is a need for a method and system for providing real-time services outage information to a cable services provider that allows the provider to quickly determine the actual locations of particular outages, and that provides insight into potential causes of a given services outage.

It is with respect to these and other considerations that the present invention has been made.

SUMMARY OF INVENTION

Embodiments of the present invention solve the above and other problems by providing a geographical network alarm viewer for providing real-time communications outage information to cable services providers. Generally, according to aspects of the present invention, communications to customer locations are monitored via network telephony voice ports through which cable telephony services are provided to each customer location. If any given voice port at any customer location experiences a loss of communications, a monitoring unit at a cable services head end detects the outage, and a network alarm associated with the outage is passed to a network operations center. Individual alarms are associated with a customer address and a cable system node from which the alarm emanates. If a threshold number of alarms is received from a given services node during a given time period, for example, more than three alarms in a single node in 120 seconds, a services outage event is automatically triggered at a system operation center.

In response, the services outage event is displayed to system operations center personnel in a computer-generated interface. Upon selection of the displayed services outage event, a report is displayed to system operation center personnel showing date/time and identification information for each communication loss associated with the event. Address information for each reported communications loss is processed by a mapping program, and if desired, system operation center personnel may display a network map showing the locations of individual communications loss alarms. Thus, the system operations center personnel receive real-time notifications of particular communications losses and a map showing the locations of the communication losses.

According to aspects of the invention, service/repair technicians and vehicles may then be sent to the particular locations of the outages. Additionally, the service/repair personnel may gain helpful insight as to the nature of the outage. For example, if the outage map shows communications losses on a particular street beyond the location of a given services distribution point, the service/repair personnel may check the suspect services distribution point before investigating individual communications losses at individual customer locations.

These and other features and advantages, which characterize the present invention, will be apparent from a reading from the following detailed description and a review of the associated drawings. It is to be understood that both the foregoing general description and the following detailed description are exemplary and explanatory only and are not restrictive of the invention as claimed.

DETAILED DESCRIPTION

Figure 1:
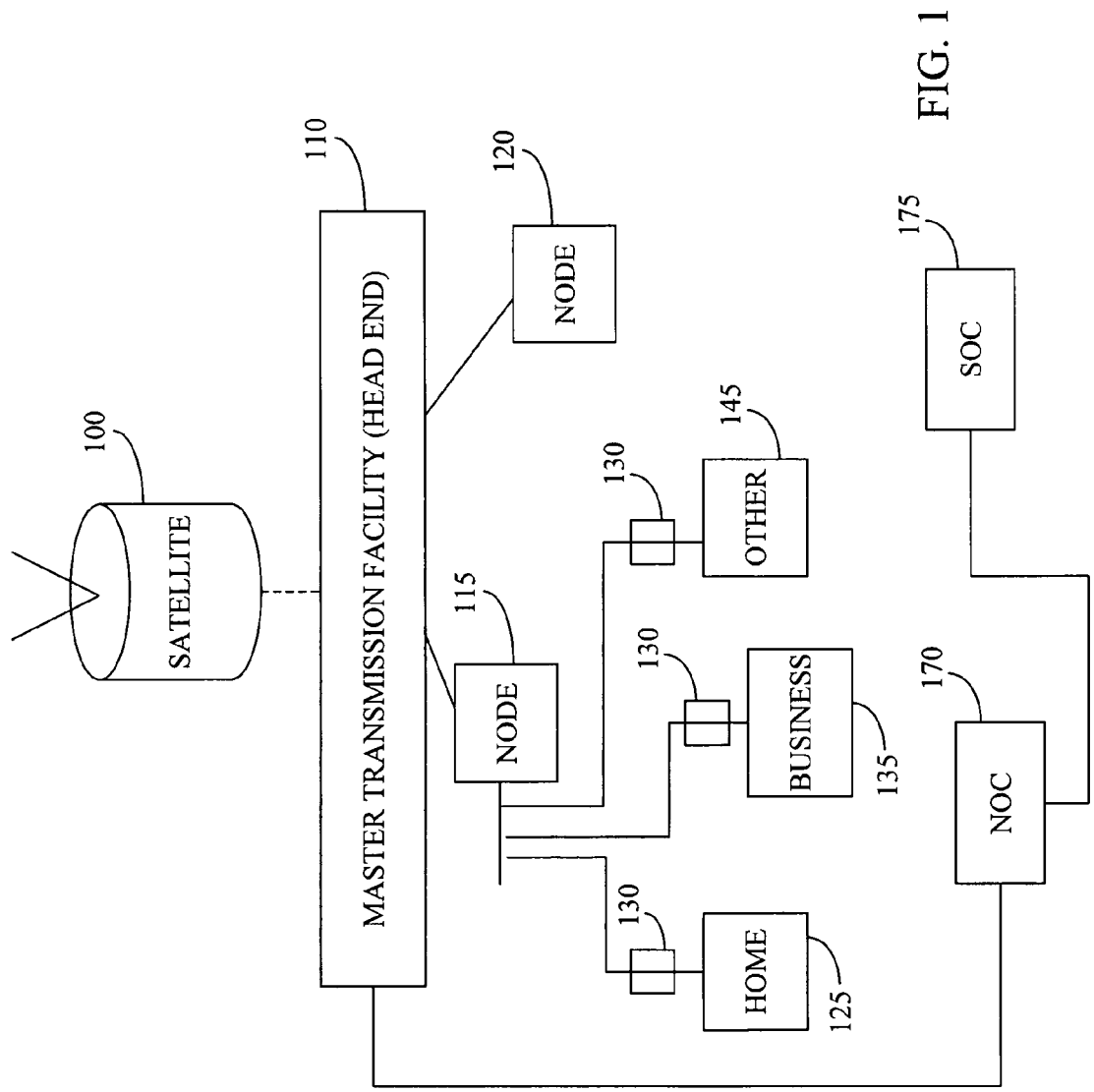
FIG. 1 illustrates an exemplary cable services system operating environment for embodiments of the present invention.

As briefly described above, embodiments of the present invention are directed to a geographical network alarm viewer for providing real-time services outage information to system operation center personnel of a cable services system. According to embodiments of the present invention, the geographical network alarm viewer (GNAV) is an information-processing application that assists personnel in quickly analyzing cable telephony services outages or other telephony-related problems in a cable services network. The GNAV application provides cable services operators the ability to monitor and correlate network alarm data into common events and to locate all of the addressees associated with those alarms on a network map.

The GNAV application involves the integration of network map data from customer premise voice ports and network alarm data from a cable services system network operation center. The GNAV application is used by personnel in a cable services system operations center and other interested parties for correlating the network alarms and determining a common point of failure in a network. The GNAV application provides accurate, real-time information on alarms that can occasionally occur in cable services and/or telephony systems. With the display of up-to-date data from network operations centers and GNAV application servers, system operation center personnel can readily locate and analyze communications losses to residences, businesses, or other users, thereby enabling service/repair personnel to identify common points of failure and to efficiently and quickly correct or otherwise repair communications losses.

These embodiments may be combined, other embodiments may be utilized, and structural changes may be made without departing from the scope or spirit of the present invention. The following detailed description is therefore not to be taken in a limiting sense, and the scope of the present invention is defined by the appended claims and their equivalents. Referring now to the drawings, in which like numerals refer to like elements throughout the several figures, aspects of the present invention will be described.

Embodiments of the present invention may be implemented in a number of distributed computing environments where functionality is tailored for providing cable services/cable-related telephony services and cable services system operations information. According to an actual embodiment, the present invention is implemented in a cable television/services system. Referring to FIG. 1, an example cable services system is illustrated. A Satellite 100 is illustrated for passing communications data through a satellite down link to a master transmission facility (also known as a Head-End) 110. Communications data from the master transmission facility 110, such as cable television broadcasting, video-on-demand, electronic mail services, advertising services, and the like, is passed over a fiber optic link such as the well known hybrid fiber coax (HFC) network to a variety of fiber optic nodes 115, 120.

As should be understood by those skilled in the art, the architecture illustrated in FIG. 1 is simplified for purposes of example, and the fiber optic nodes 115, 120 are illustrative of a variety of additional nodes, which may be utilized for distributing communications from a master transmission facility 110. For example, a given fiber optic node 115, 120 may be utilized for transmitting communications data to many homes, businesses, schools, or other facilities such as the illustrated home 125, business 135, and other facility 145, illustrated in FIG. 1. For example, a master transmission facility 110 may be located in a given city, and a variety of nodes 115, 120 may be located around the city for transmitting communications data from the master transmission facility to homes, businesses, and the like serviced by a given fiber optic node 115, 120. As is well known to those skilled in the art, communications data from a fiber optic node 115, 120 is converted from optical transmission to electrical transmission for passing over a coaxial cable to individual homes 125, businesses 135, other facilities 145, and the like.

According to embodiments of the present invention, at each customer location, for example, the home 125, the business 135, or other consumer location 145, a network voice port 130 is situated at customer locations through which cable telephony communications are provided to individual customer locations from a servicing fiber optic node 115, 120. According to one embodiment, a monitoring unit at the head end 110 monitors telephony communications to/through each voice port 130. If at any time communications from a given node 115 are lost to a given customer location 125 via an associated network voice port 130, the monitoring unit at the head end 110 detects the outage and passes an alarm signal to a network operation center 170. The alarm associated with a given network voice port 130 includes a date/time stamp indicating a date and time of a particular communications loss, and an identification of the voice port. According to another embodiment, an identifying alphanumeric for the customer location associated with the voice port, identification information for other customer premises equipment, and a street address associated with the particular customer location may also be provided with the alarm. Alternatively, as described below, information in addition to the date/time stamp and identification of the alarming voice port is maintained separately and is later associated with the alarming port.

Figure 2:
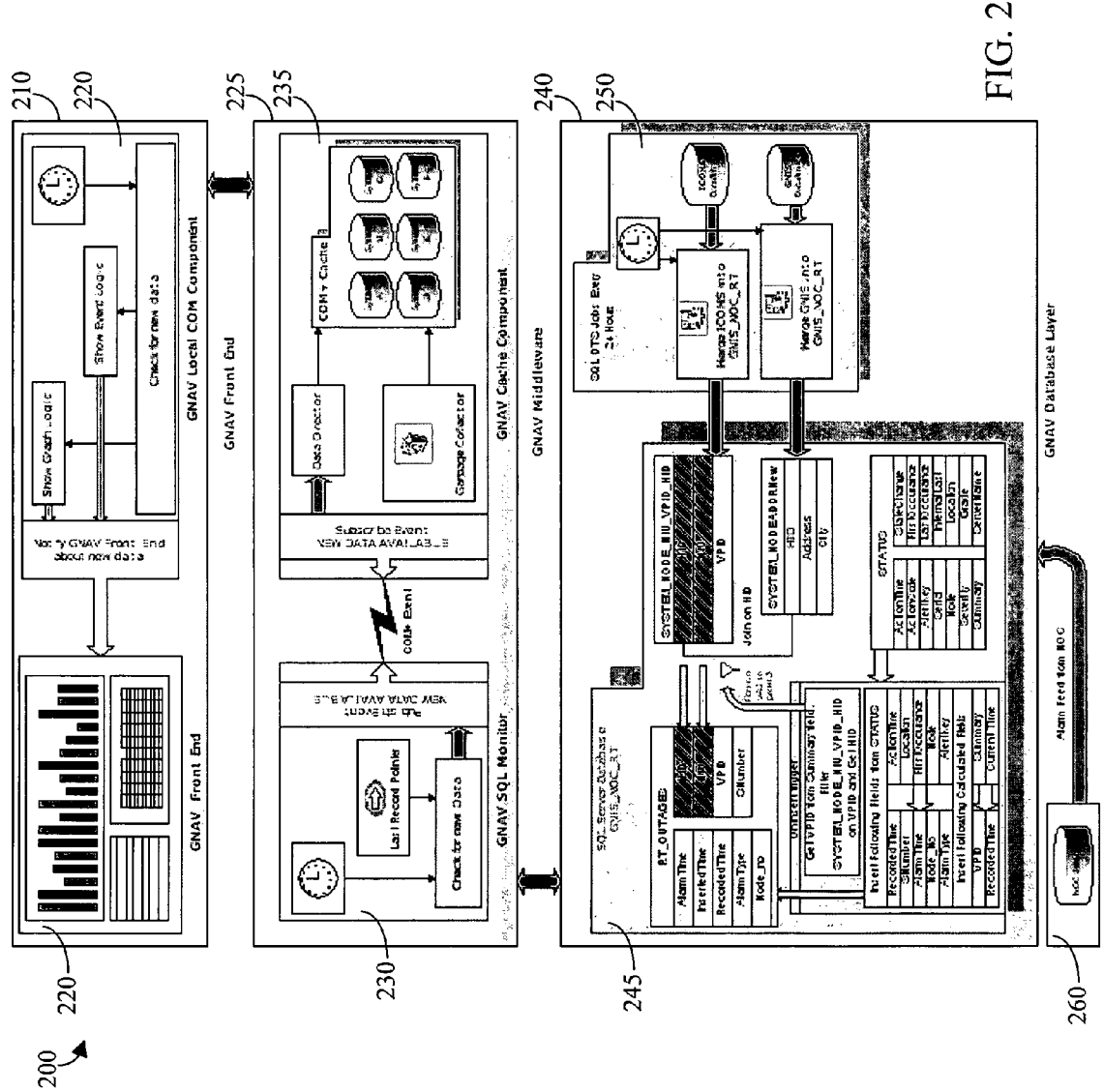
FIG. 2 is a simplified block diagram showing an exemplary architecture for a geographical network alarm viewer application according to embodiments of the present invention.

FIG. 2 is a simplified block diagram showing an exemplary architecture for a geographical network alarm viewer application according to embodiments of the present invention. According to embodiments of the present invention, the geographical network alarm viewer (GNAV) application, illustrated in FIG. 2, may be operated at a system operation center 175 (SOC) by SOC personnel for collecting, tracking aggregating, displaying, reporting, and mapping information on cable system network outages. Alternatively, the GNAV application may be operated at other locations, such as information systems/services departments of a services provider, having access to required data, described herein. The GNAV application 200, illustrated in FIG. 2 is comprised of a GNAV database layer 240, a GNAV middleware layer 225, and a GNAV front end 210. As should be appreciated, the architecture illustrated in FIG. 2 may operate according to a distributed computing environment where various components of the architecture are located separately and communicate across distributed communications systems such as intranets and the Internet.

The GNAV database layer 240 receives services outage alarms from the network operations center 170 that are received at the network operations center (NOC) from individual voice port units 130, described above. The GNAV database layer 240 aligns each network alarm with information received from individual voice port units 130 identifying individual communication losses, as described above. For example, identification information associated with individual communication losses may include a date/time stamp indicating a date and time of a particular communications loss, an identification of the alarming voice port, an identifying alphanumeric for the customer location associated with the voice port, identification information for other customer premises equipment, and a street address associated with the particular customer location. The GNAV database layer maintains information associated with individual communications losses (services outages) on a dedicated GNAV SQL server 245.

According to one embodiment, information associated with individual customer locations, described above, such as an identifying alphanumeric for the customer location associated with the voice port, identification information for other customer premises equipment, a street address associated with the particular customer location, and mapping information associated with individual customer locations are maintained in a server 250 for supplying to the GNAV SQL server 245 for aligning with individual services outage alarms. This information may be maintained in a variety of sources. For example, according to one embodiment, such information as identifying information about the customer location may be retrieved from a billing system operated by the cable services provider. Mapping information may be retrieved from a mapping database or server that maintains mapping data for all network assets utilized for providing and maintaining services.

According to one embodiment, the GNAV middleware layer 225 is made up of Microsoft Windows services and COM+ Components. At the GNAV SQL monitor 230, the Windows services applications execute algorithms for finding network outages from the data received from individual voice port units 130 and for grouping individual outages as events once the number of outages exceeds a threshold number of outages during a threshold period of time, for example, more than three outages in 120 seconds. Memory efficient and highly scalable COM+ cache components store the data processed by the Windows services in the GNAV cache component 235. The GNAV cache component 235 is an in memory database that stores the processed information used in the GNAV front end 210.

The GNAV front end 210 includes a user interface utilized by system operating center personnel for reviewing and retrieving data processed by the GNAV application about system outage events. The front end 210 (user interface) shows the information from the GNAV cache component 235 to a user in a graphical way, as described below with respect to FIG. 3. According to one embodiment, the GNAV front end 210 is deployed on a CITRIX farm for ease of deployment and maintenance and is secured by GNAV authorization tools, which require authentication and authorization for access to the GNAV application and associated data by users.

Figure 3:
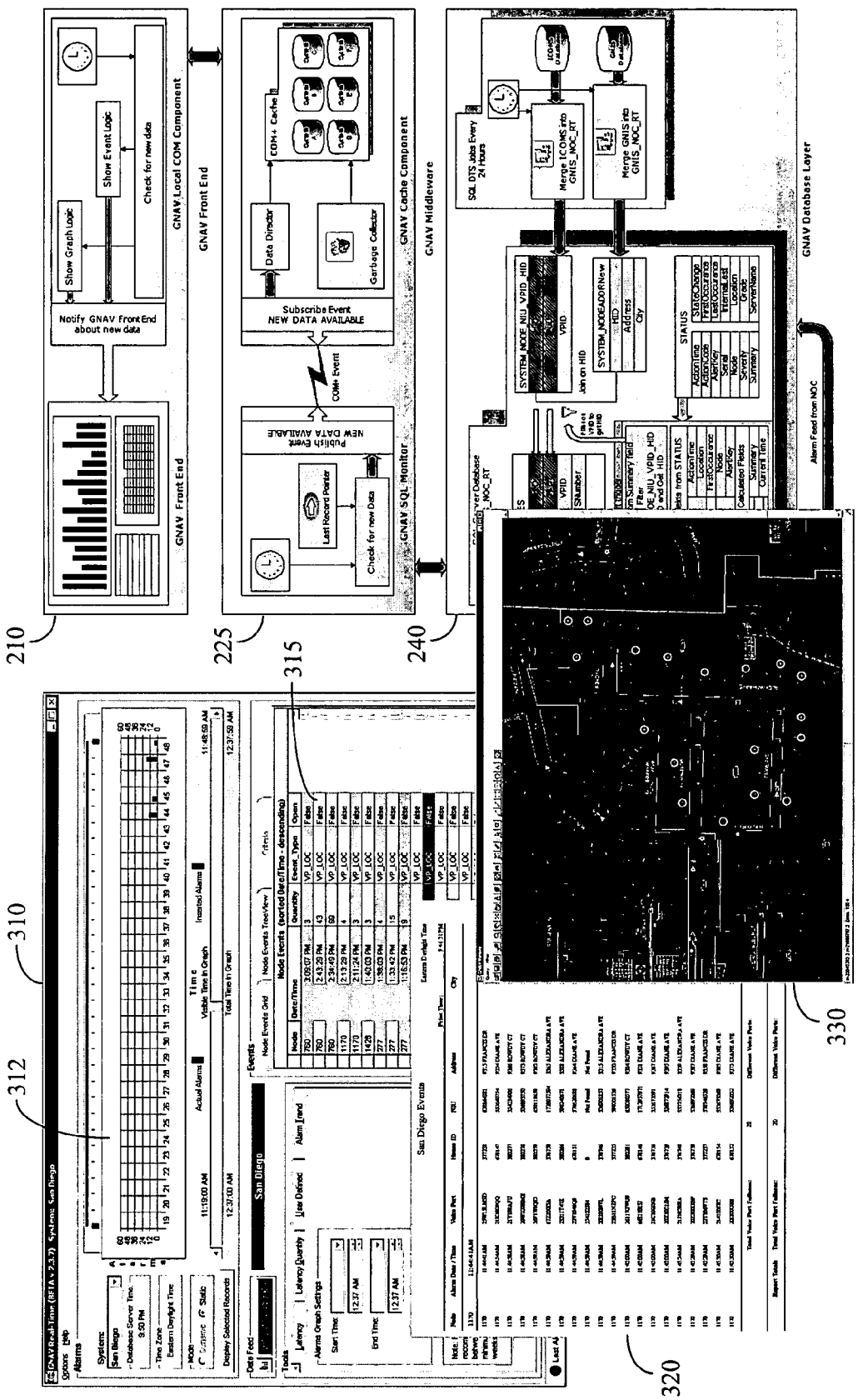
FIG. 3 illustrates a computer screen display showing a geographical network alarm viewer user interface, a services outage event report, and a services outage map according to embodiments of the present invention.

FIG. 3 illustrates a computer screen display showing a geographical network alarm viewer user interface, a services outage event report, and a services outage map according to embodiments of the present invention. As illustrated in FIG. 3, a user interface 310 is provided by the GNAV front end 210 for showing information to a user about system/services outage events. As should be appreciated, an authorized user of the user interface 310, may launch and utilize the user interface 310 from a variety of computing devices located at a variety of locations having access to the GNAV application. For example, referring to FIG. 3, the user interface 310 shows information from the GNAV cache component 235 in a graphical manner. For example, a real-time graph 312 is provided for graphically illustrating received alarms during given time periods associated with a given services node 115, 120. An outages events grid 315 is provided in the user interface 310 for allowing the user (SOC personnel) to see individual events or to obtain additional information about individual events. As described above, if individual services outages exceeding a given threshold number during a given threshold period of time occur, the GNAV application 200 determines that a services outage event has occurred. Once a services outage event has occurred, the services outage event is displayed by the GNAV application 200 in the events spreadsheet-like grid 315 for review by the user.

According to embodiments of the present invention, if the user selects a given services outage event from the events grid 315, an events report 320 is displayed showing the date/time, voice port identification, customer location identification, customer premises equipment identifications, and customer street address for each services outage comprising the selected event. The SOC personnel or other user may review the events report 320 to quickly and efficiently and in real-time determine the number of and locations of services outages or communications losses associated with the selected events. Thus, the SOC personnel or other user is not required to wait for telephone calls from customers who have lost services, or other ineffective and inefficient means of determining the locations of communications losses. Additionally, by reviewing the real-time information and obtaining information such as precise date and times of services losses, the SOC personnel or other users may receive insight into potential causes of the services outages. For example, if all services outages occurred at exactly the same time, the SOC personnel may determine that a single communication loss caused all associated services outages at each associated customer address. On the other hand, if services outages associated with the selected event occurred at different times, SOC personnel may determine that the cause of the communication outages is associated with some other problem, such as power fluctuations and the like.

Figure 4:
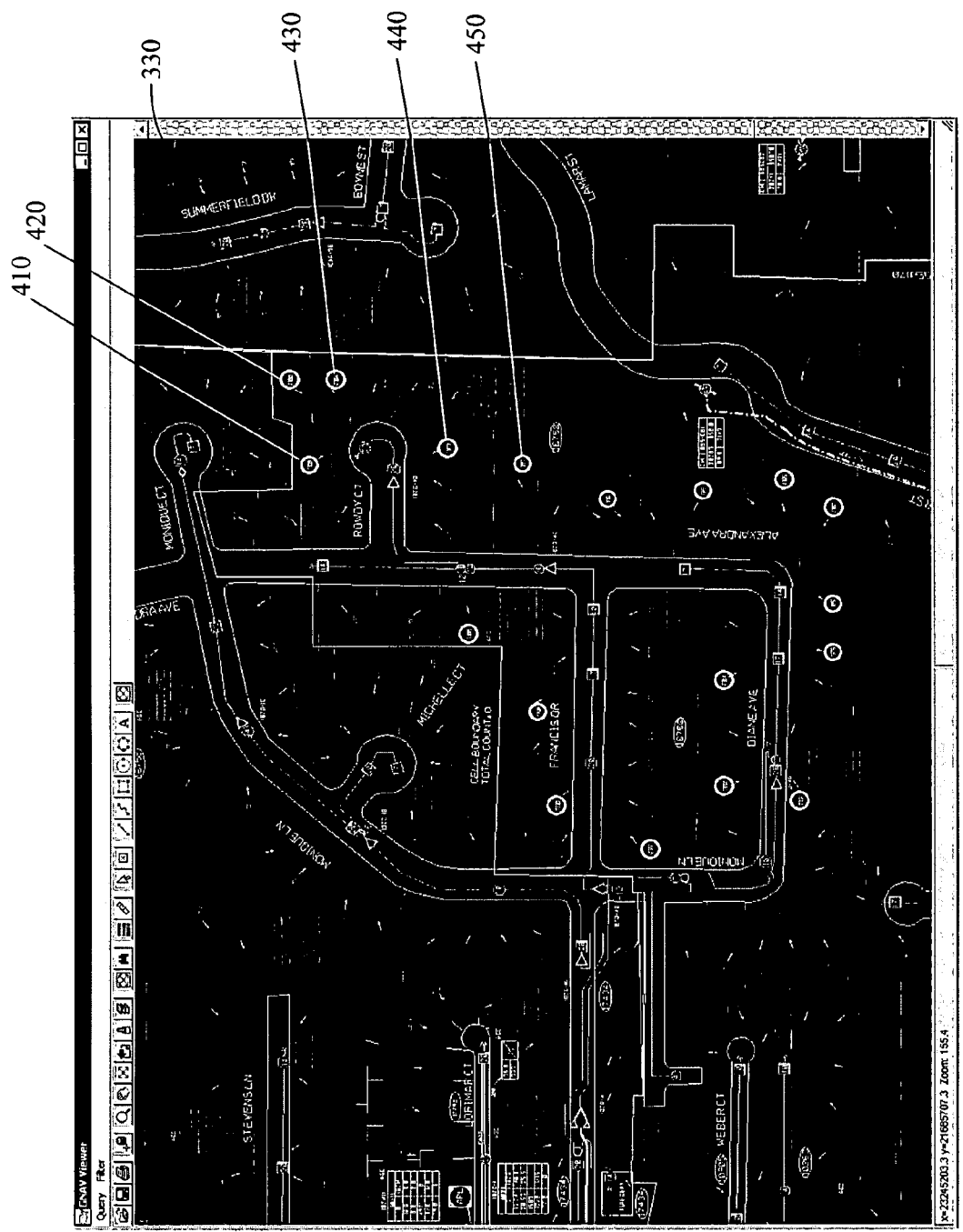
FIG. 4 illustrates a computer screen display showing an example services outage map according to embodiments of the present invention.
Figure 5:
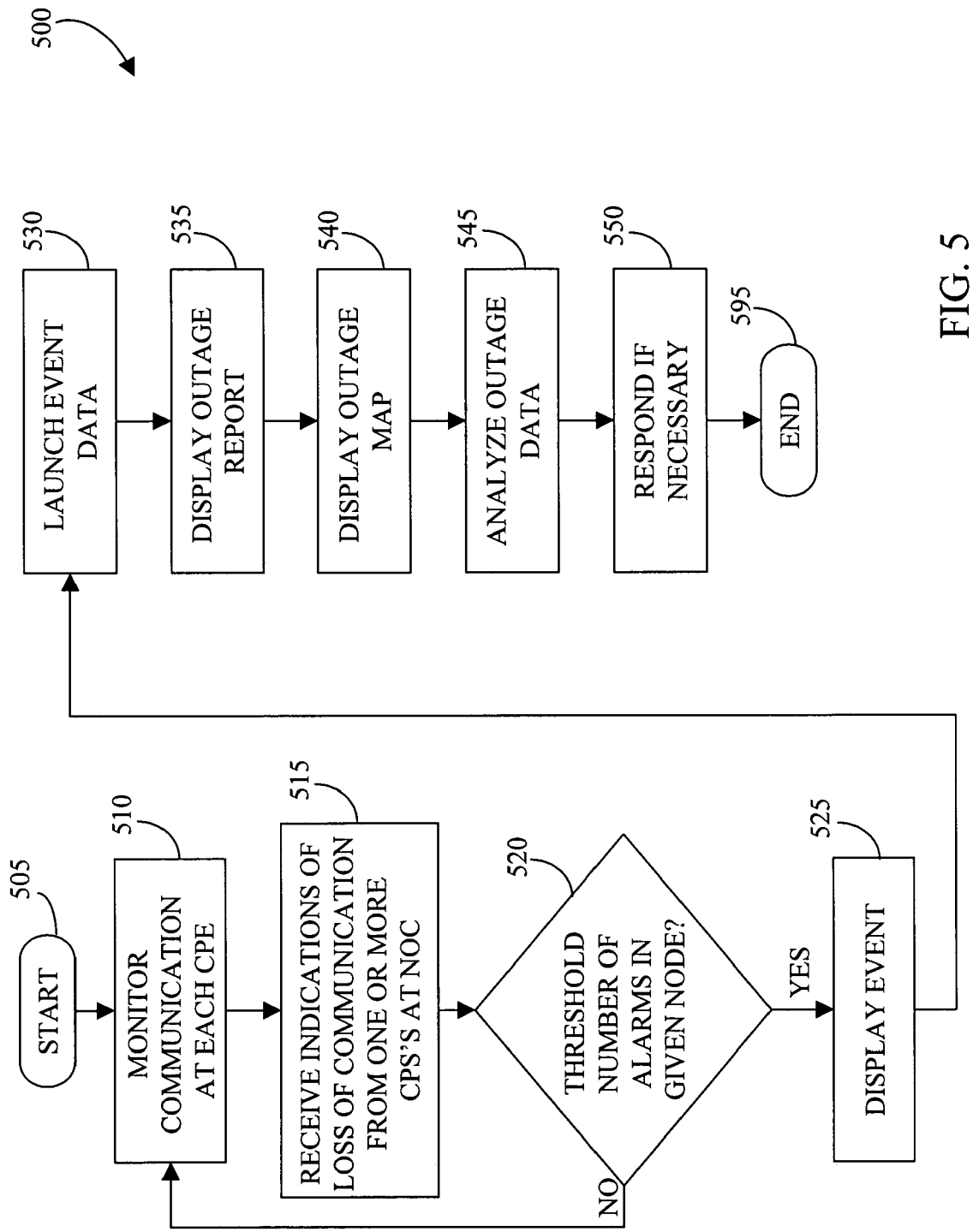
FIG. 5 is a flow diagram showing an illustrative routine for monitoring, reporting, and displaying cable telephony services outage information according to embodiments of the present invention.

If desired, a network map 330 may be displayed showing each address associated with each communication loss/services outage mapped on a street map 330 for showing SOC personnel or other users the locations of each of the services outages relative to each other and relative to other items such as streets and buildings identified on the map. Referring to FIG. 4, the network map 330 is illustrated showing the locations of individual services outages as circles 410, 420, 430, etc. According to one embodiment, the network map 330 is a mapping of the locations of assets and service provision locations for a given services provider. According to this embodiment, network alarm information for given voice ports is mapped to the network map relative to other network assets and service locations and relative to geographical data such as streets and highways. Alternatively, the locations of individual network alarms comprising a services outage event could be mapped to a generic computer-generated map using address information associated with each network alarm.

By reviewing the map 330, SOC personnel or other authorized users may determine useful information about services outages associated with a given outage event that may assist SOC personnel in determining a cause of the service outages and in determining a proper course of action for repairing or otherwise dealing with the outages. For example, as illustrated in FIG. 4, four services outages 410, 420, 430, 440 are illustrated around a street cul-de-sac displayed in the map 330. In addition to showing SOC personnel the precise location of the services outages, the location of the services outages around the street cul-de-sac may provide SOC personnel with insight as to a potential cause of the services outages. For example, a single communications distribution point may be situated at the mouth of the street cul-de-sac for providing communications to each of the customer locations situated around the street cul-de-sac. The display of the service outages around the example street cul-de-sac may thus call attention to SOC personnel to check the status of such a communications distribution point. In addition, if SOC personnel determine the need for rolling a service vehicle and service technicians to the area of the services outages, a determination may be made based on the geographical area illustrated in the map 330 of the appropriate number of service vehicles and technicians that are needed to effect repairs or otherwise deal with the service outages.

Having described an exemplary architecture for operation of embodiments of the present invention above with respect to FIGS. 1-4, FIG. 5 is a flow diagram showing an illustrative routine for monitoring, reporting, and displaying cable telephony services outage information according to embodiments of the present invention. The routine 500 begins at start block 505 and proceeds to block 510 where communications are monitored at each telephony customer location by a monitoring unit at the head end 110 via the voice port units 130 located at each telephony-enabled location. At block 515, an indication of a loss of communications is received from a given customer location via an associated voice port 130, and the indication of the loss of communication is transmitted by the head end 110 to the NOC 170. The received indication (alarm) is passed from the NOC 170 to the GNAV database layer 240 for storage in the GNAV SQL server 245, as illustrated in FIG. 2.

As described above, the alarm indication received by the GNAV database layer 240 includes a date/time stamp for the received alarm and identification for the associated voice port 130. According to one embodiment, identification information for the identified voice port 130, for example, customer location address, node number, and the like, along with mapping data associated with the identified voice port 130 is passed from the server 250 to the server 245 for association with the received alarm indication. As described above, mapping data may be retrieved from a network mapping data server and other information, such as customer address, may be retrieved from other servers/databases, such as databases maintained by a billing system.

At block 520, a determination is made as to whether a threshold number of alarms has been received in a given node during a threshold period of time. For example, as described above, it may have been previously determined that an appropriate threshold number of alarms is equal to three alarms during any 120 second period. At block 520, if a threshold number of alarms has not been received during a given period of time from customer locations in a given fiber optic node 115, the routine proceeds back to block 510, and communications monitoring continues. At block 520, if a threshold number of alarms has been received during a threshold period of time, the routine proceeds to block 525, and the GNAV application 200 assembles the data for each alarm as an outage event and displays the outage event in the user interface 310 in the services outage grid 315.

At block 530, if a SOC personnel or other service technician desires to review information associated with a displayed outage event, the SOC personnel may select a desired event from the outage grid 315. In response, at block 535, an outage event report 320 is displayed to the SOC personnel, as described above with reference to FIG. 3. If desired, at block 540, the map 330 may be displayed for mapping the locations of each service outage/communication loss making up the selected outage event. At block 545, SOC personnel may analyze the service outage data displayed in the events report 320 and mapped in the map 330. At block 550, SOC personnel or other service technicians may respond to the service outage event and associated individual service outages. The routine ends at block 595.

As described herein, the GNAV application 200 receives, tracks, aggregates, reports, and maps data associated with cable telephony services outages occurring in a cable services network. The GNAV application integrates network map data and identification information associated with customer locations, equipment, and associated network alarm data from a network operations center. All customer location addresses associated with individual network alarms are located and mapped on a geographical network map. Thus, SOC personnel have the ability to monitor and correlate network alarm data into common events. Because the alarms are received, tracked, aggregated, reported, and mapped in real-time, SOC personnel and other service technicians may respond to network outages in a more efficient manner, and service technicians and service vehicles may be directed to repair service outages based on more accurate location and service outage timing data. In addition, while monitored and reported services outages are associated with cable telephony services, SOC personnel or other services personnel may gain valuable insight into potential problems with other related cable services by seeing real-time telephony services outage information. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of tracking and reporting services outages in a communications services system, comprising:

performing real-time monitoring, from a head end of a communications services system, of communications at voice ports of a plurality of customer locations;

detecting a loss of communications at voice ports at customer locations in a given service area;

routing to a processing center alarms from voice ports containing information associated with the detected loss of communications;

storing information from the alarms associated with the detected loss of communications at the voice ports;

processing the information from the alarms associated with the detected loss of communications at the voice ports to aggregate the alarms having information associated with the detected loss of communications at the voice ports;

determining whether a number of aggregated alarms in the given service area received during a threshold time period exceeds an alarm threshold representing a service outage event; and when the number of aggregated alarms in the given service area received during a threshold time period exceeds an alarm threshold, providing at a remotely accessible graphical display of the communications services system, information associated with the service outage event and the associated voice ports.

2. The method of claim 1, further comprising, mapping a location of each indication of loss of communications to a computer-generated map for graphically showing the location of each indication of loss of communications.

3. The method of claim 2, wherein the detecting a loss of communications at voice ports at customer locations in a given service area includes receiving a communications loss alarm comprising a date/time stamp associated with a date and time of the communications loss alarm and an identification of a communications port associated with the given service location.

4. The method of claim 1, wherein the storing information from the alarms associated with the detected loss of communications includes storing the date/time stamp associated with a date and time of the communications loss alarm and an identification of a communications port associated with the given service location in a database of communications loss alarm data.

5. The method of claim 4, further comprising, associating with stored information associated with a given indicated loss of communications, additional information identifying an address of the given service location from which the communication loss alarm is received.

6. The method of claim 1, wherein the providing a service outage event report for showing identification information associated with each indication of loss of communications at any of the given service locations comprising the service outage event is in response to a received selection of the service outage event from the service outage event grid.

7. The method of claim 1, wherein the performing real-time monitoring from a head end of a communications services system, of communications at voice ports of a plurality of customer locations includes monitoring cable telephony communications to and from the plurality of service locations.

8. A system for tracking and reporting services outages in a communications services system, comprising:
  a system operation center executing a geographical network alarm viewer application operative to perform real-time monitoring, from a head end of a communications services system, of communications at voice ports of a plurality of customer locations;
  to detect a loss of communications at voice ports at customer locations in a given service area;
  to route to a processing center alarms from voice ports containing information associated with the detected loss of communications;
  to store information from the alarms associated with the detected loss of communications at the voice ports;
  to process the information from the alarms associated with the detected loss of communications at the voice ports to aggregate the alarms having information associated with the detected loss of communications at the voice ports;
  to determine whether a number of aggregated alarms in the given service area received during a threshold time period exceeds an alarm threshold representing a service outage event; and
  to provide at a remotely accessible graphical display of the communications services system, information associated with the service outage event and the associated voice ports when the number of aggregated alarms in the given service area received during a threshold time period exceeds an alarm threshold.

9. The system of claim 8, wherein the geographical network alarm viewer application is further operative to map a location of each indication of loss of communications to a computer-generated map for graphically showing the location of each indication of loss of communications.

10. The system of claim 8, wherein the geographical network alarm viewer application is further operative to associate with stored information associated with a given detected loss of communications, additional information identifying an address of the given service location from which the communication loss alarm is received.

11. A computer readable medium on which is stored computer executable instructions which when executed by a computer perform a method of tracking and reporting services outages in a communications services system storing:
  program instructions executable by a processing device to perform operations for tracking and reporting services outages in a communications services system, the operations comprising:
  performing real-time monitoring, from a head end of a communications services system, of communications at voice ports of a plurality of customer locations;
  detecting a loss of communications at voice ports at customer locations in a given service area;
  routing to a processing center alarms from voice ports containing information associated with the detected loss of communications;
  storing information from the alarms associated with the detected loss of communications at the voice ports;
  processing the information from the alarms associated with the detected loss of communications at the voice ports to aggregate the alarms having information associated with the detected loss of communications at the voice ports;
  determining whether a number of aggregated alarms in the given service area received during a threshold time period exceeds an alarm threshold representing a service outage event; and
  when the number of aggregated alarms in the given service area received during a threshold time period exceeds an alarm threshold, providing at a remotely accessible graphical display of the communications services system, information associated with the service outage event and the associated voice ports.

12. The computer readable medium of claim 11, wherein the operations further comprising, mapping a location of each indication of loss of communications to a computer-generated map for graphically showing the location of each indication of loss of communications.

13. The computer readable medium of claim 11, wherein the detecting a loss of communications at voice ports at customer locations in a given service area includes receiving a communications loss alarm comprising a date/time stamp associated with a date and time of the communications loss alarm and an identification of a communications port associated with the given service location.

14. The computer readable medium of claim 13, wherein the storing information from the alarms associated with the detected loss of communications includes storing the date/time stamp associated with a date and time of the communications loss alarm and an identification of a communications port associated with the given service location in a database of communications loss alarm data.

15. The computer readable medium of claim 14, wherein the operations further comprising, associating with stored information associated with a given indicated loss of communications, additional information identifying an address of the given service location from which the communication loss alarm is received.

* * * * *